(12) United States Patent
Bildhaeuser et al.

(10) Patent No.: US 7,908,268 B2
(45) Date of Patent: Mar. 15, 2011

(54) PREDICTIVE DATABASE POOL PREPARATION

(75) Inventors: Hans-Juergen Bildhaeuser, Aidlingen (DE); Holger Karn, Aidlingen (DE); Andreas Limmer, Deckenpfronn (DE)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 11/944,776

(22) Filed: Nov. 26, 2007

(65) Prior Publication Data

US 2008/0189305 A1 Aug. 7, 2008

(30) Foreign Application Priority Data

Feb. 6, 2007 (EP) .................................... 07101778

(51) Int. Cl.
*G06F 7/00* (2006.01)
*G06F 17/30* (2006.01)
(52) U.S. Cl. ........................................................ 707/720
(58) Field of Classification Search .................. None
See application file for complete search history.

(56) References Cited

U.S. PATENT DOCUMENTS 4,829,427 A * 5/1989 Green .................................... 1/1
7,610,460 B2 * 10/2009 Watanabe et al. ............. 711/162

OTHER PUBLICATIONS

Kabra et al, Efficient Mid-Query Re-Optimization of Sub-Optimal Query Execution Plans, 1998, ACM, SIGMOD '98, pp. 106-117.*
Yeh et al, Two-Level Adaptive Training Branch Prediction, 1991, ACM, Proceedings of the 24$^{th}$ annual international symposium on Microarchitecture, 51-61.*
Gounaris et al, Adapquery Processing: A Survey, 2002, Springer-Verlag, vol. 2405/2002, 11-25.*

* cited by examiner

*Primary Examiner* — Pierre M Vital
*Assistant Examiner* — Jason Liao
(74) *Attorney, Agent, or Firm* — Francis Lammes; Stephen J. Walder, Jr.; Elissa Y. Wang

(57) ABSTRACT

A method, system, and computer program product are provided for operating a relational database management system (RDBMS). In order to operate a RDBMS, information is read from a first execution plan in response to an execution request for a second individual database statement of a second sequence of database statements. The information is processed and pool resource requirements for execution of further individual database statements of the second sequence of database statements are evaluated. A preparation request is sent for pool modification based on the evaluated pool resource requirements to an asynchronous pool preparation queue. Then the second individual database statement of the second sequence of database statements is executed. The information indicative of the progression of execution of the second individual database statement is stored in a position register.

16 Claims, 8 Drawing Sheets

PREDICTIVE DATABASE POOL PREPARATION

FIELD OF THE INVENTION

The present invention relates to the field of computer systems and methods, and more particularly without limitation to the field of predictive database pool preparation.

BACKGROUND AND RELATED ART

A trend in modern microprocessor development is that the microprocessors are much faster than attached storage devices delivering the respective data the processor requires for operation. In order to prevent lack of data, fast and small memories 'caches' have been developed. These caches are used to acquire data from slower storage devices and store data to enable fast access by the microprocessor. This reduces the average microprocessor access time to the required data and increases the computer system performance.

However, the difficulty for a computer system is to predict which data will be needed in future microprocessor operations. Since the cache has only a limited size, only a limited amount of data can be preloaded into the cache. In order to efficiently control data flow to and from the cache, several strategies for cache management have been developed.

A common data replacement policy which determines which data can be discarded from the cache is the Least-Recently-Used (LRU) policy. The LRU policy is typically based on removing data in the cache that have least recently been requested or that are not often been requested, or a combination of both. Another strategy for cache management is predictive caching of data. For example for database applications, predictive caching utilizes certain algorithms to predict future data read requests. This comprehends recognition and learning of access patterns and detection of related access requests. The database system can use this information to preload data which is predicted to be used in the future. This reduces waiting times for data which are needed by an application or by the microprocessor for further processing.

U.S. Pat. No. 5,305,389 (Mark L. Palmer et al.) discloses a predictive cache system. Prefetches to a cache are made from predictions which are based on access patterns generated from prior accesses of a data processing system. During a training sequence, access patterns are generated and stored in a pattern memory. Also, access patterns generated from prior accesses of the data processing system are stored in the pattern memory. A predictor analyzes a current access pattern to predict from the similar access patterns stored in the pattern memory possible accesses to objects. Predicted objects are then prefetched to be stored in a cache memory. A cache memory subsystem evicts objects from the cache memory by order of priority, with most recent objects being assigned high priority to remain in the cache relative to other objects in the cache.

The problem with predictive caching is that prefetching of predicted objects for storage in a cache memory might be impossible, if the cache memory is not featuring the necessary control structures or data or if the free cache memory is not big enough to accept the prefetched object. Since cache resizing can cause long response times, incoming prefetching requests can be delayed which slows down the overall database system performance.

SUMMARY OF THE INVENTION

In accordance with the present invention there is provided a computer implemented method of operating a relational database management system (RDBMS). The RDBMS comprises a database, a pool and first execution plan. The first execution plan comprises nodes which represent first individual database statements of a sequence of first database statements (which is called a database transaction) and the nodes comprise information regarding pool resource requirements for executing the first sequence of database statements. In response to an execution request for a second individual database statement of a second sequence of database statements, information is read from the first execution plan. The information is processed and pool resource requirements for execution of further individual database statements of the second sequence of database statements are evaluated.

The method comprises sending of a preparation request for pool modification based on the evaluated pool resource requirements to an asynchronous pool preparation queue. This is followed by execution of the second individual database statement of the second sequence of database statements. Information indicative of the progression of execution of the second individual database statement is then stored in a position register, i.e. the progression of execution of the currently active second individual database statement is tracked by the RDBMS using the position register.

The invention is particularly advantageous as caches, or in an embodiment of the invention pools, are individually adjusted by the preparation request for pool modification for the execution of database statements. The preparation request for pool modification may comprise the resizing of the pool or the establishment of appropriate control structures. Therefore, any required resources regarding the respective database statement might already be available and the statement can be executed immediately. Since the pool preparation queue works asynchronously to the execution of the database statements, waiting times to make the required resources available are reduced and the overall RDBMS performance is increased.

According to an embodiment of the invention, the RDBMS comprises an application, the application forms an execution plan, the execution plan comprises at least one database transaction, and the database transaction comprises at least the first and/or second sequence of database statements. The order of database statements for a given database transaction in the respective execution plan defines the respective execution sequence of database statements.

Thereby, the application regarding the first sequence of database statements is uniquely assigned to the first execution plan. In order to determine if the application regarding the second sequence of database statements is also assigned to the first execution plan, the RDBMS is queried and a second execution plan is created and uniquely assigned to the application, if the application regarding the second sequence of database statements is not assigned to the first execution plan. The information about the pool resource requirements used for executing the second individual database statement is then updated in the respective execution plan. Updating of the pool resource requirements in the respective execution plan includes appending of a statement node.

In accordance with an embodiment of the invention the nodes in the execution plans comprise application nodes, transaction nodes and statement nodes. Connections between statement nodes define the execution sequence of database statements of a given database transaction. A statement node can be connected to several other statement nodes or even to itself. Each node in the execution plan is represented by a unique application node identifier, a respective unique transaction node identifier or a respective database statement identifier.

An execution plan thereby reflects the flow of previously executed database statements for a given database application. New incoming database applications will therefore result in a newly created execution plan. New database statements or different flows in the database statement execution sequence will result in new branches of the graphs in the execution plan.

In accordance with an embodiment of the invention, the information stored in the position register comprises for each database statement of an active database transaction information describing a respective node in a respective execution plan. The information stored in the position register comprises a respective unique application identifier, a respective unique node identifier and a respective unique database statement identifier. Since the RDBMS tracks the execution of all currently active database transactions and their database statements in the position register, this allows the RDBMS to easily check if an incoming database statement has to result in a new node in the respective execution plan and to use the execution plan information to predict the resource requirements for subsequent database statement executions of this database transaction, based on the knowledge of the previous execution of this database transaction as traced in the execution plan.

In accordance with an embodiment of the invention, the execution plan comprises metrics for each node. For example, an application might be identified by various metrics, according to the type of issued database statements (e.g. dynamic or static SQL), such as application name for applications executing dynamic SQL, or plan and package name for applications executing static SQL.

After finished execution of the second individual database statement, information of respective pool resource requirements are queried from the database and stored as metrics in the respective node of the execution plan. The metrics comprise a list of used database descriptors (DBDs) resulting from execution of the second individual database statement cached in the environmental descriptor manager (EDM), storage size for cached resource identifiers (RIDs) resulting from execution of the second individual database statement in RID pool, maximum sort storage size used for sorting operations in sort pool, if sorting was used. The sorting operations result thereby from execution of the second individual database statement. The metrics further comprise a list of used cursor tables (CTs) in the EDM, if the second individual database statement is an SQL statement and an open cursor SQL statement was used. The CTs result from querying pool resource requirements for executing the second individual database statement.

However the invention is not limited to above mentioned metrics and allows usage of additional metrics to include preparation requests for other types of database statements (e.g. XML Queries), other pools or to even improve preparation requests for the mentioned pools. Also the used metrics might vary between the existing RDBMS.

In accordance with an embodiment of the invention, after completion of a database transaction (for example by execution of an SQL COMMIT statement), the node associated with the last executed database statement of this database transaction will become a leaf node. Compared to the above mentioned metrics comprised in nodes, the leaf nodes additionally comprise further metrics comprising a summary of all used database descriptors (DBDs) of all nodes in the respective path of the leaf node of this last executed database statement. The DBDs are resulting from execution of this last database statement. The leaf nodes further comprise metrics regarding the maximum of used storage for caching resource identifiers (RIDs) of all nodes in this path of the leaf node of this last executed database statement. The RIDs are resulting from execution of this last database statement. The leaf nodes further comprise metrics regarding the maximum of used sort pool size of all nodes in this path of the leaf node of this last executed database statement and a list of all cursor tables (CTs) of all nodes in this path of the leaf node of this last database statement. Thereby, the CTs are resulting from querying pool resource requirements for executing this last database statement.

In accordance with an embodiment of the invention, for a newly initiated database transaction summary information for all leaf nodes in the respective execution plan based on the metrics comprised in these leaf nodes is sent to the asynchronous pool preparation queue. The summary information comprises a summary of all used database descriptors (DBDs) of all nodes in all possible paths of the respective execution plan, the maximum of used storage for caching resource identifiers (RIDs) of all nodes in all possible paths of the respective execution plan, the maximum of used sort pool size of all nodes in all possible paths of the respective execution plan and a list of all cursor tables (CTs) of all nodes in all possible paths of the respective path of the execution. The summary information is used to evaluate pool resource requirements for a newly initiated execution plan, i.e. whenever for example a new database transaction is initiated. The advantage of this method is, that pool resource requirements are provided to the pool in advance independently of the individual database statements contained in the respective application.

In accordance with an embodiment of the invention a previous request for pool modification will be updated with reevaluated pool resource requirements if subsequent individual database statements restrict the remaining tree of database statements in the respective execution plan of the current database transaction. Any request for pool modification is used by the pool while being idle. The request for pool modification is removed from the asynchronous pool preparation queue if the database transaction is completed.

These methods of pool management ensure permanent updating of the pool with both, predicted and actual pool resource requirements. Since the pool uses the requests for pool modification while being idle, maintaining of high database system performance is possible.

In another aspect the invention relates to a computer program product which comprises computer executable instructions in order to perform the method of the invention.

In another aspect the invention relates to a data processing system in order to perform the method.

In accordance with an embodiment the invention relates to a data processing system wherein the RDBMS is DB2.

However the invention is not limited to DB2 and can also be applied to other database systems.

BRIEF DESCRIPTION OF THE DRAWINGS

In the following embodiments of the invention will be described in greater detail by way of example only making reference to the drawings in which.

DETAILED DESCRIPTION

Figure 1:
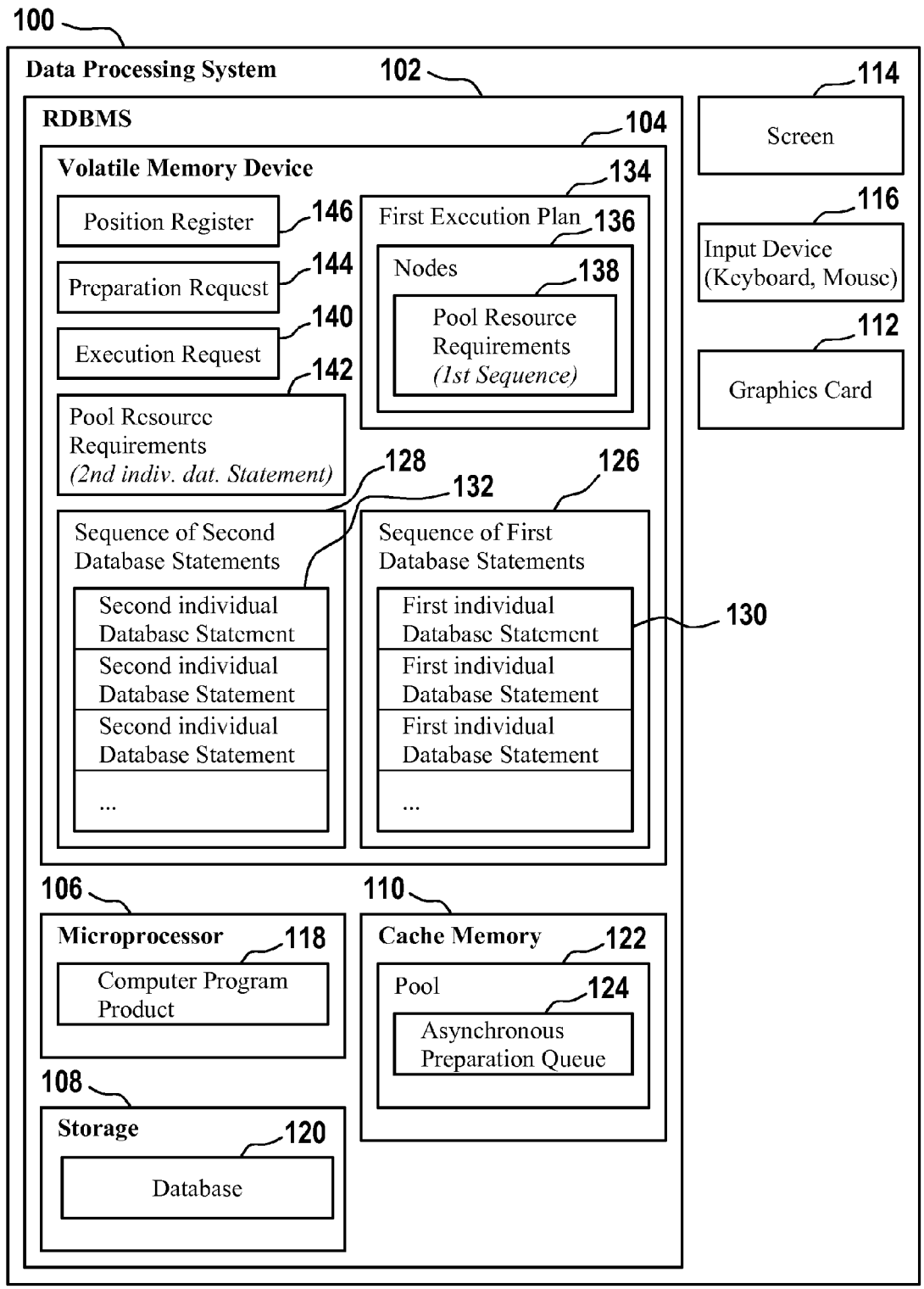
FIG. 1 is a block diagram of a data processing system that implements one embodiment of the present invention.

FIG. 1 is a block diagram of a data processing system 100 that implements one embodiment of the present invention. The data processing system 100 generally comprises a relational database management system (RDBMS) 102, a graphics card 112 to generate output on a screen 114 and an input device 116 (keyboard, mouse, network interface etc.). In an embodiment of the invention, the RDBMS can for example be DB2 from IBM Corporation.

The RDBMS is a system that can comprise a volatile memory device 104, a microprocessor 106, a storage device 108 and a cache memory 110. The volatile memory device 104 can for example be a random access memory (RAM) device. The storage device can for example be a hard disk or a tape drive. The at least one microprocessor 106 is employed to process commands of a computer program product 118. The storage device 108 comprises a database 120 which contains data to be processed by the microprocessor 106.

The cache memory 110 can for example comprise a pool 122 and the pool comprises an asynchronous preparation queue 124. The pool can be used for storing prefetched objects. The volatile memory device 104 comprises sequences of first 126 and second 128 database statements and the sequences of first 126 and second 128 database statements comprise first 130 and second 132 individual database statements. The database statements can for example be static or dynamic SQL statements or XML queries. The volatile memory device further comprises a first execution plan 134, the first execution plan 134 comprises nodes 136 and the nodes 136 comprise information regarding pool resource requirements 138 for executing the sequence of database statements 126.

In an embodiment of the invention, the information regarding pool resource requirements 138 for executing the first sequence of database statements 126 is read from the first execution plan 134 in response to an execution request 140 for a second individual database statement 132 of a second sequence of database statements 128. The information is processed by the microprocessor 106 and pool resource requirements 142 for the execution request 140 for the second individual database statement 132 are evaluated. A preparation request 144 for pool modification based on the evaluated pool resource requirements 142 is sent to the asynchronous preparation queue 124 of the pool 122 and the second individual database statement 132 is executed by the microprocessor 106. Furthermore, information indicative of the progression of execution of the second individual database statement is stored in a position register 146.

Figure 2:
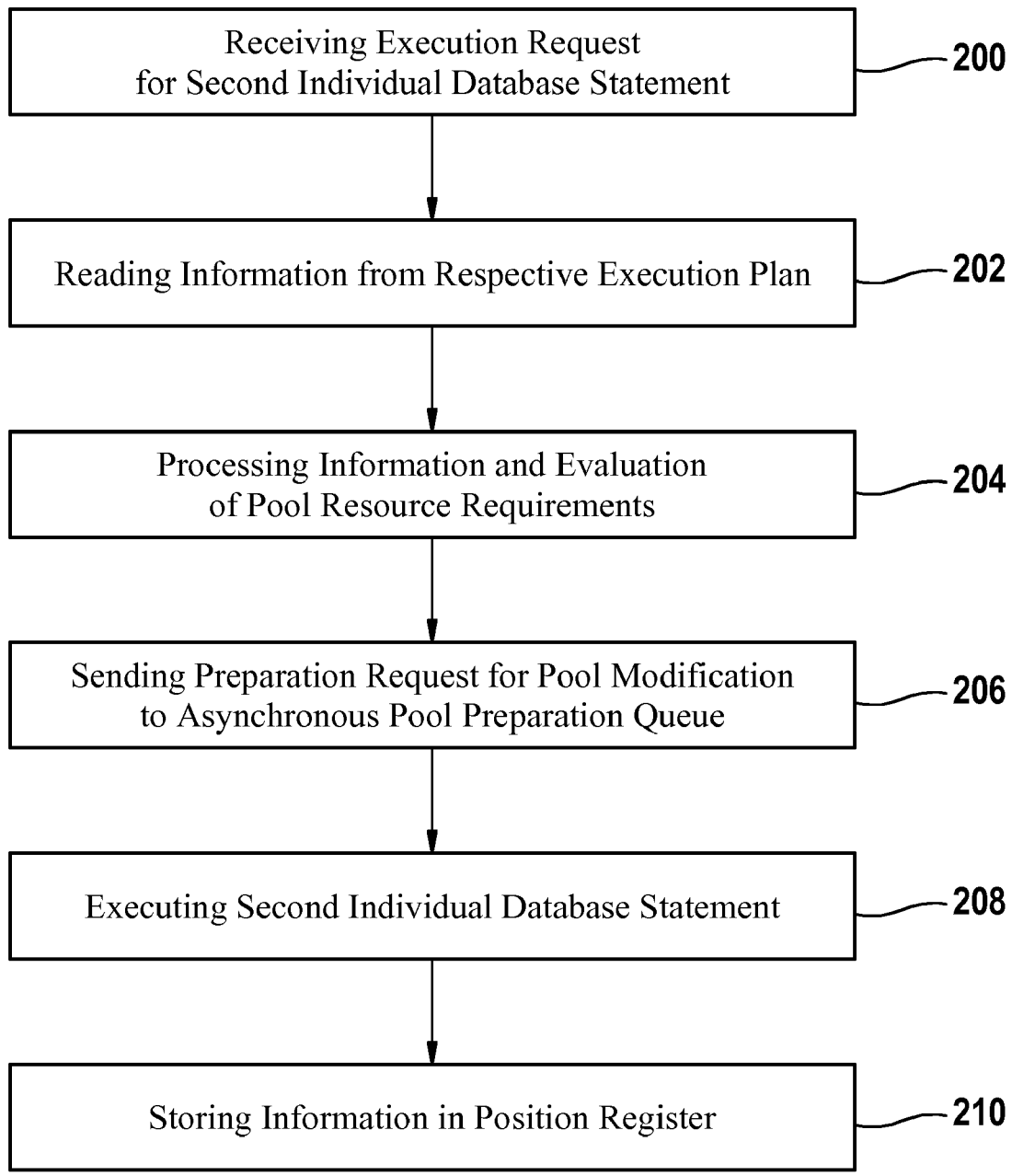
FIG. 2 is a flow diagram of a method of an embodiment of the invention.

FIG. 2 is a flow diagram of a method of an embodiment of the invention. In response to receiving an execution request in step 200 for execution of a second individual database statement of a database transaction (i.e. of the second sequence of database statements), information regarding respective pool resource requirements for the database statement execution is obtained by reading from the respective execution plan in step 202. After processing the information and evaluating pool resource requirements in step 204, a preparation request for pool modification based on the evaluated pool resource requirements is sent to an asynchronous pool preparation queue in step 206. The second individual database statement is executed in step 208 and information indicative of the progression of execution of the second individual database statement is stored in a position register in step 210.

Figure 3:
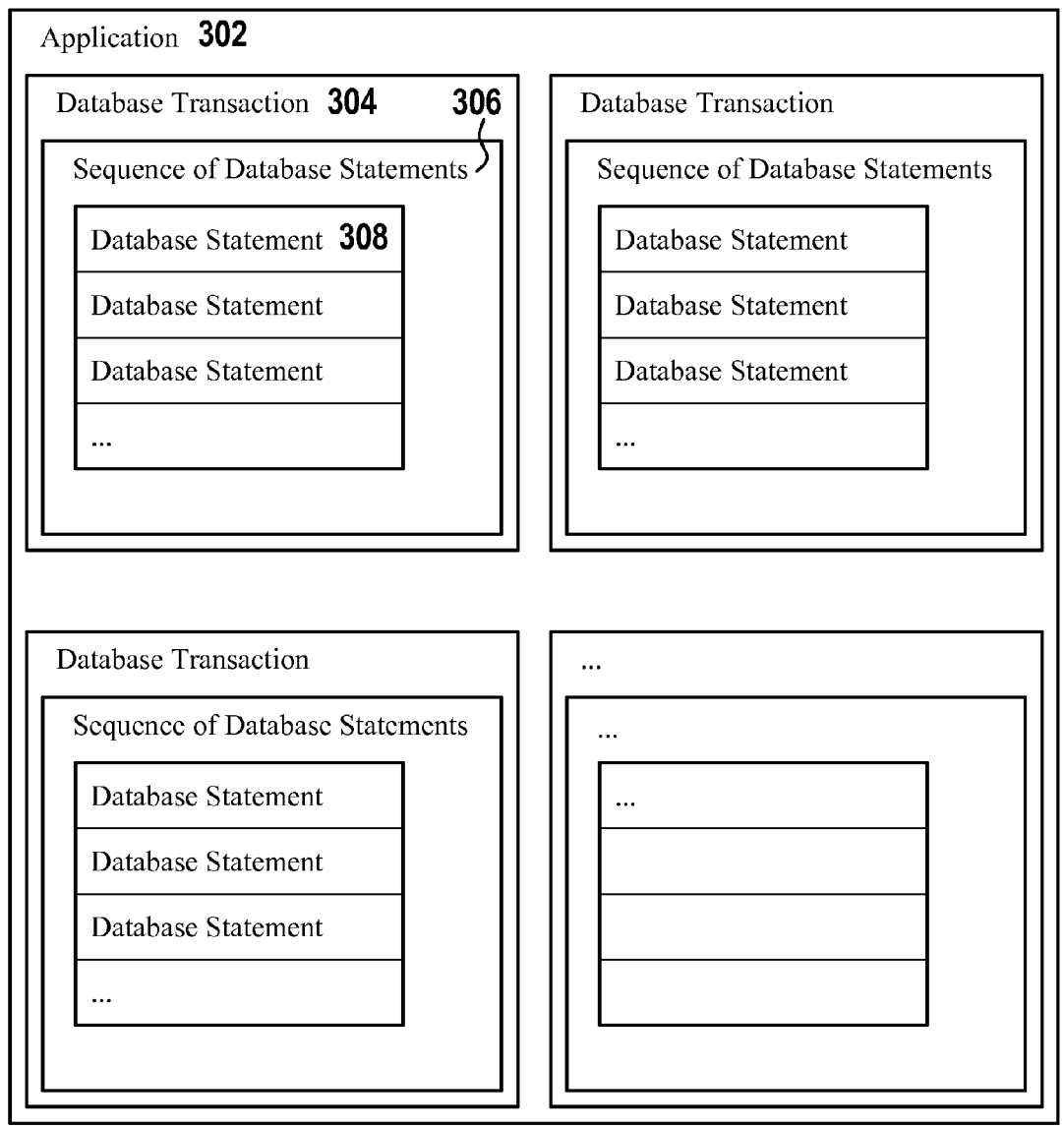
FIG. 3 illustrates an embodiment of the structure of a database execution plan.

FIG. 3 illustrates an embodiment of the structure of a database execution plan in more detail. An RDBMS comprises an execution plan 300, the execution plan comprises an application 302 and the application 302 comprises at least one database transaction 304. The at least one database transaction comprises a sequence of database statements 306 composed of various individual database statements 308.

Figure 4:
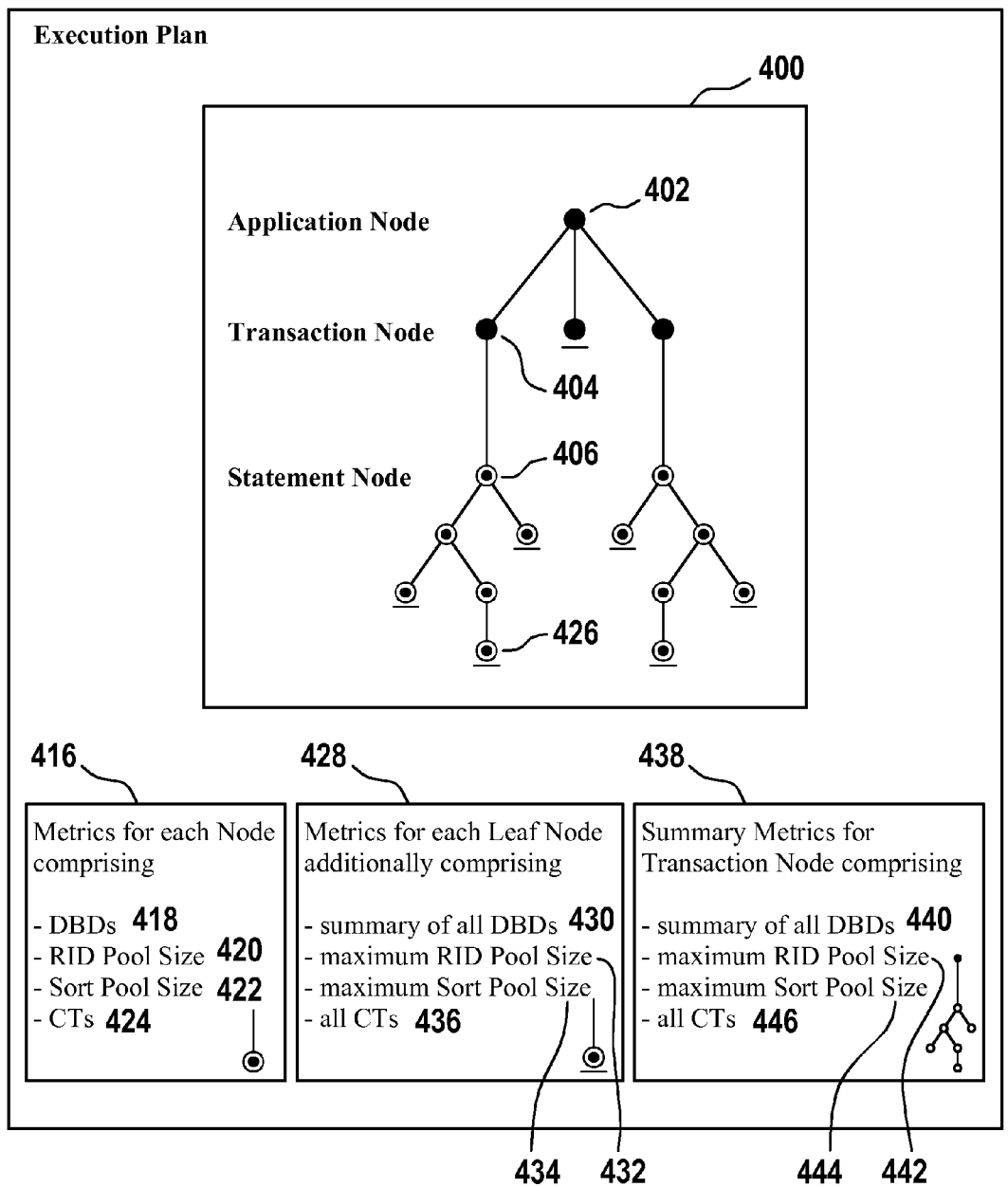
FIG. 4 illustrates an embodiment of the data structure of an execution plan.

FIG. 4 illustrates an embodiment of the data structure of an execution plan 400. An application is uniquely assigned to a respective execution plan. For example, the application of the respective execution plan is assigned to the application node 402, which branches for example to at least one respective transaction node 404. Each transaction node 404 further branches to at least one database statement node 406 which is associated with a respective individual database statement of a respective sequence of database statements.

All the execution plans comprise metrics 416 for each node. The metrics are determined after finished execution of an individual database statement. The metrics comprise information of respective pool resources required by the executed individual database statement. The metrics comprise a list of used database descriptors 418 (DBDs) resulting from the execution of the individual SQL statement cached in an EDM. The metrics further comprise a list of the used storage size for cached resource identifiers 420 (RIDs) resulting from the execution of the individual database statement in a RID pool, as well as the maximum sort storage size 422 used for sorting operations in a sort pool, if sorting was used. Thereby, the sorting operations result from execution of the individual SQL statement. If the individual database statement is an open cursor SQL statement, the metrics also comprise cursor tables 424 (CTs) in the EDM. These CTs are resulting from querying pool resource requirements for executing the individual database statement.

Additionally to the metrics 416, the leaf nodes 426 further comprise metrics 428 comprising summary metrics 430 of all database descriptors (DBDs) of all nodes in the respective path of the leaf node of the individual database statement, whereby the DBDs are resulting from execution of the respective database statements. The summary metrics 430 further comprise the maximum of used storage 432 for caching resource identifiers (RIDs) of all nodes in the respective path of the leaf node of the respective individual database statement, the RIDs resulting from execution this database statement. The summary metrics further comprise the maximum of used sort pool size 434 of all nodes in this path of this leaf node of this respective database statement, as well as a summary metrics regarding the list 436 of all cursor tables (CTs) of all nodes in this path of the leaf node of this respective database statement. Hereby, the CTs are resulting from querying pool resource requirements for executing this respective database statement.

The execution plan 400 further comprises summary information 438 for all leaf nodes of a given transaction node in the execution plan based on the metrics comprised in the corresponding leaf nodes. The summary information comprises a summary 440 of all database descriptors (DBDs) of all nodes in all possible paths of the database transaction of the execution plan, the maximum of used storage 442 for caching resource identifiers (RIDs) of all nodes in all possible paths of the database transaction node of the execution plan, the maximum of used sort pool size 444 of all nodes in all possible paths of the database transaction node of the execution plan and a list 446 of all cursor tables (CTs) of all nodes in all possible paths of the database transaction node of execution plan.

Figure 5A:
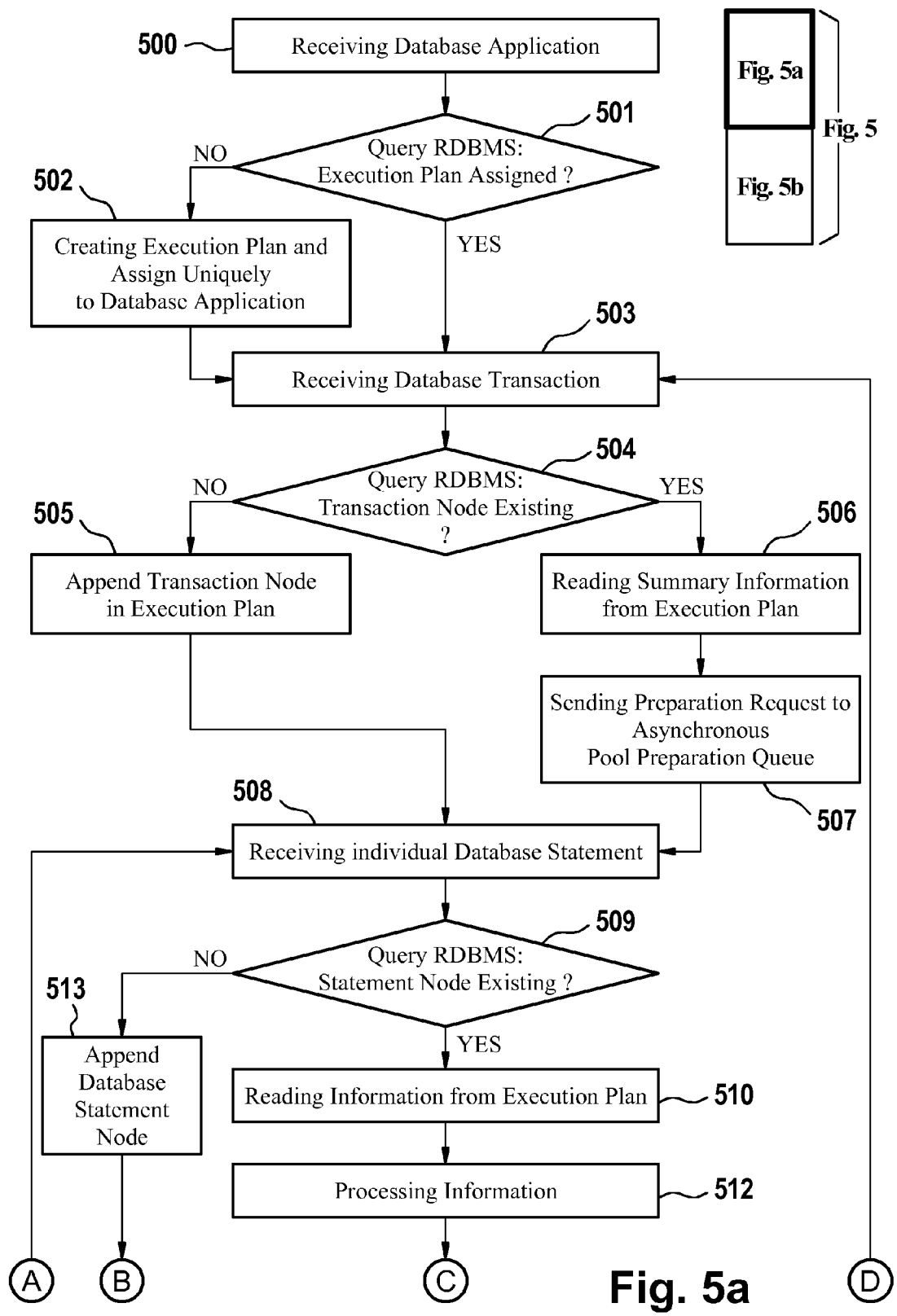
FIG. 5 is a flow diagram of a method of an embodiment of the invention.
Figure 5B:
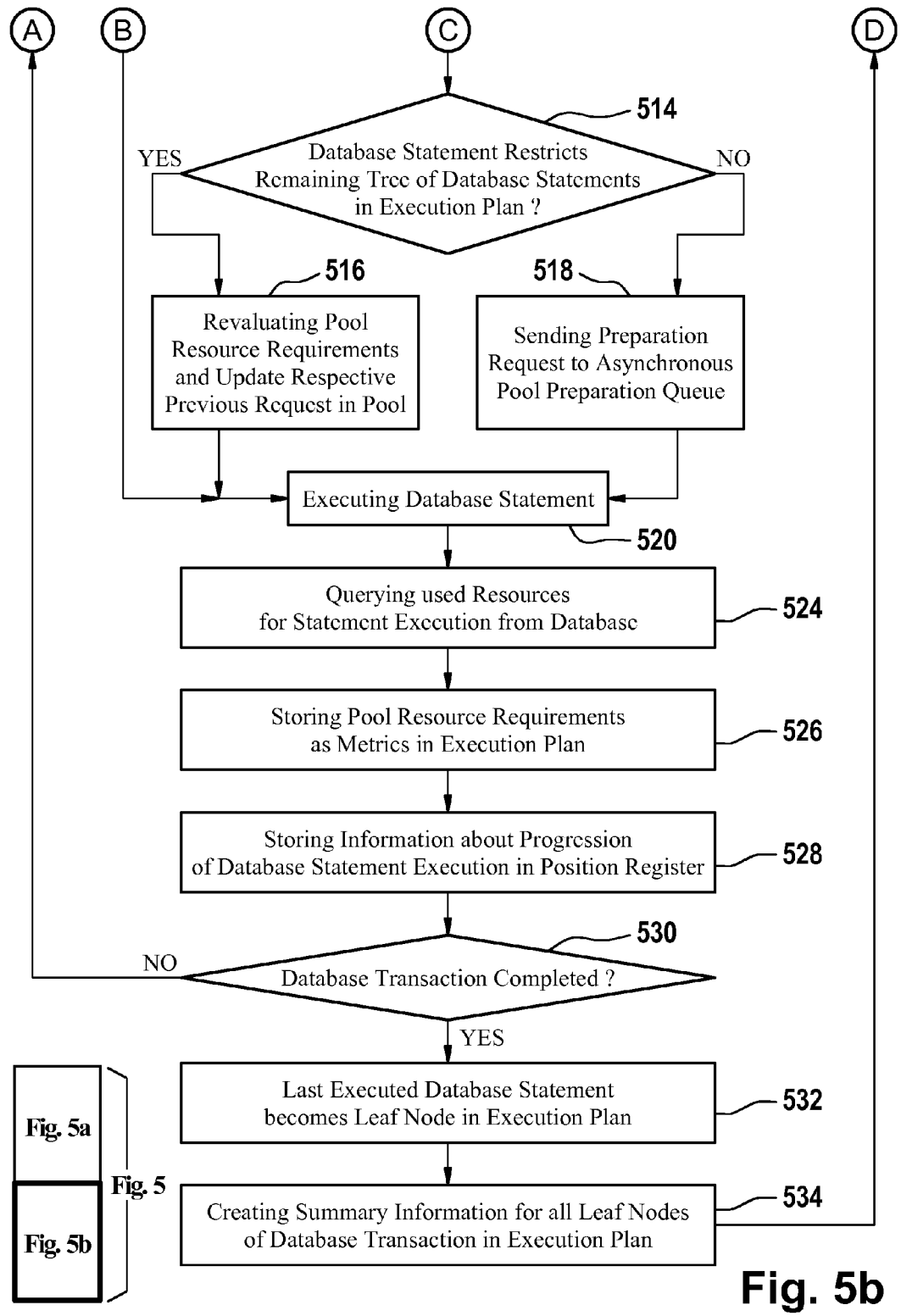

FIG. 5 is a flow diagram of a method of an embodiment of the invention. In step 500, an application is received by for example a microprocessor. The RDBMS is queried in step 501, if a first execution plan is already assigned to the application. In case the first execution plan is not assigned the application, a second execution plan is created and uniquely assigned to the application in step 502. Either after creation of the new execution plan in step 502 or in case querying the RDBMS in step 501 returns that the application is already assigned to the first execution plan, a respective database transaction of the application is received by for example the microprocessor in step 503.

The RDBMS is queried in step 504, if a respective transaction node in the respective execution plan is already assigned to said database transaction. In case said database transaction is not assigned a transaction node in the respective execution plan, a transaction node is created and appended in the respective execution plan and uniquely assigned to the database transaction in step 505. In case querying the RDBMS in step 504 returns that the said database transaction is already assigned a transaction node in the respective execution plan, summary information regarding pool resource requirements for execution of database statements of the respective database transaction is read from the respective execution plan in step 506. In step 507, a preparation request for pool modification based on the summary information regarding pool resource requirements is sent to an asynchronous preparation queue to the pool.

Either after appending of said transaction node in step 505 or after sending the preparation request for pool modification in step 507, an individual database statement regarding said database transaction is received in step 508. In step 509, the RDBMS is queried if said database statement is assigned a respective database statement node in the respective execution plan. In case said database statement node is already assigned to the respective execution plan, information regarding pool resource requirements for executing the individual database statement is read from the respective execution plan in step 510 and processed in step 512. If said database statement is not assigned a respective statement node in the respective execution plan, a respective statement node is appended in the respective execution plan in step 513.

After execution of step 512, the database statement might restrict the remaining possible tree of executions in the respective execution plan in step 514. Therefore, in step 516 a respective previous request for pool modification is updated with reevaluated pool resource requirements if the evaluation of the pool resource requirements for the execution request for the individual database statement restricts in step 514 the remaining tree of database statements in the respective execution plan. If said database statement did not restrict the remaining tree of database statements in the respective execution plan in step 514, a preparation request for pool modification based on the evaluated pool resource requirements is sent to an asynchronous preparation queue to the pool in step 518.

Either if the database statement did not restrict the remaining tree of database statements in the respective execution plan in step 516, or after step 518, or if a new statement node was appended in the respective execution plan in step 513, the database statement is executed in step 520. After finishing the execution, information about the pool resource requirements used for execution of the individual database statement are queried from the database in step 524 and updated as metrics in the respective execution plan in step 526.

In order to track the execution progression of the sequence of database statements of the database transaction and to be able to update the respective execution plan at the appropriate position, information regarding the executed second individual database statement is stored in the position register in step 528. In step 530 it is checked if the execution of the respective sequence of database statements (i.e. database transaction) of the database statement is completed.

In case the execution of the sequence of database statements is completed, the second individual database statement will become a leaf node in the respective execution plan in step 532. In case the execution of the sequence of database statements is not completed, the method is repeated with the subsequent individual database statement of the sequence of database statements of the database transaction in step 508. If in step 530 the database transaction is completed, summary information for all leaf nodes of the database transaction of the respective execution plan is generated in step 534. The method is continued with receiving of the next database transaction by for example the microprocessor in step 503.

Figure 6:
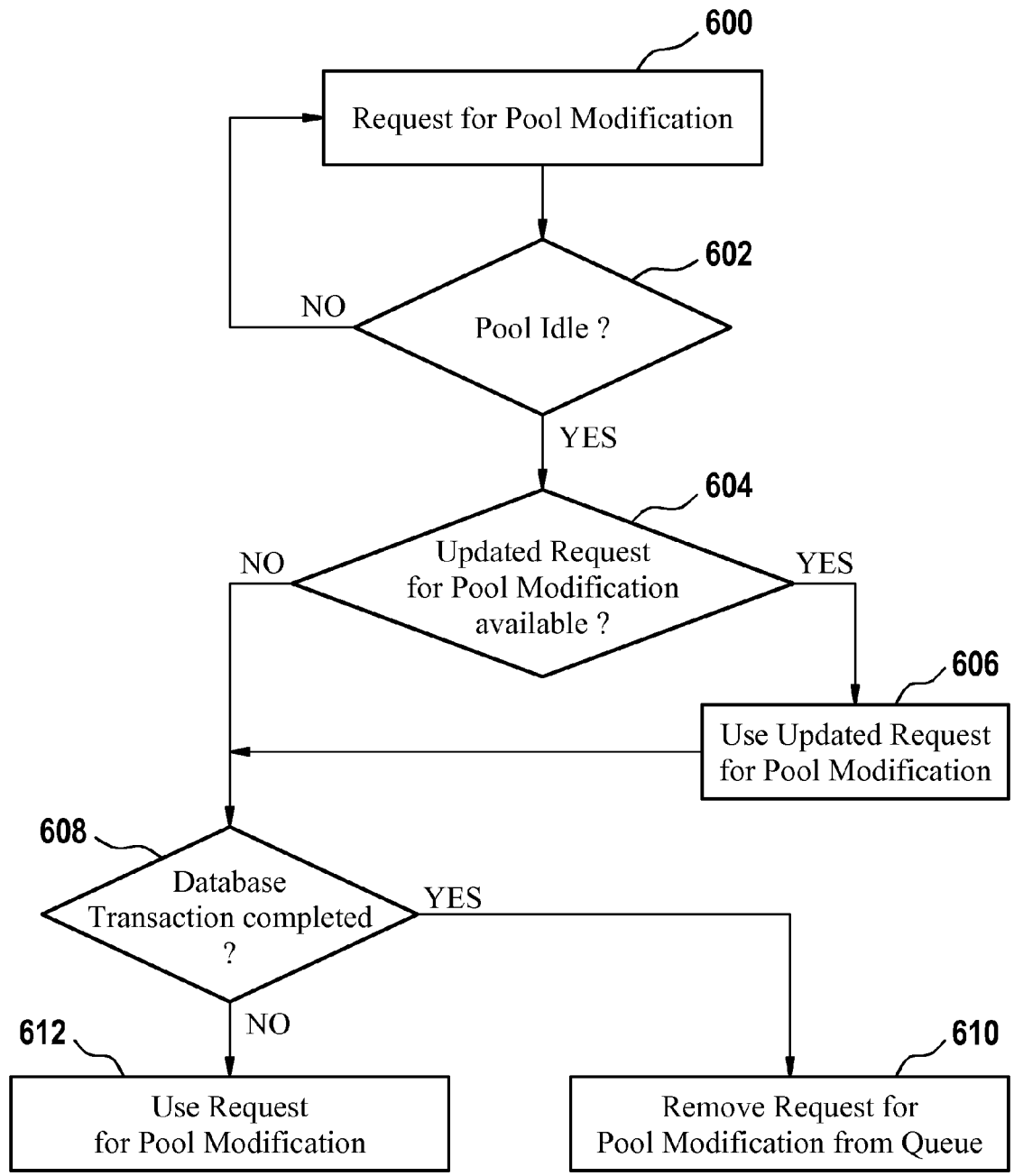
FIG. 6 is a flow diagram illustrating an embodiment of the pool management.

FIG. 6 illustrates a flow diagram illustrating an embodiment of the pool management. For a request for pool modification 600 it is checked, if the pool is idle in step 602 in order to accept the request for pool modification in its asynchronous preparation queue. Subsequently, in case an updated request for pool modification due to the availability of more precisely requests for pool modification arrives in step 604 at the asynchronous pool preparation queue, in step 606 only the youngest preparation request will be taken into account and all other respective requests are removed from the queue. If in the meantime the corresponding database transaction has been completed in step 608, the request for pool modification is removed from the asynchronous pool preparation queue in step 610. Otherwise, the request for pool modification in the asynchronous pool preparation queue is used by the pool in step 612.

Figure 7:
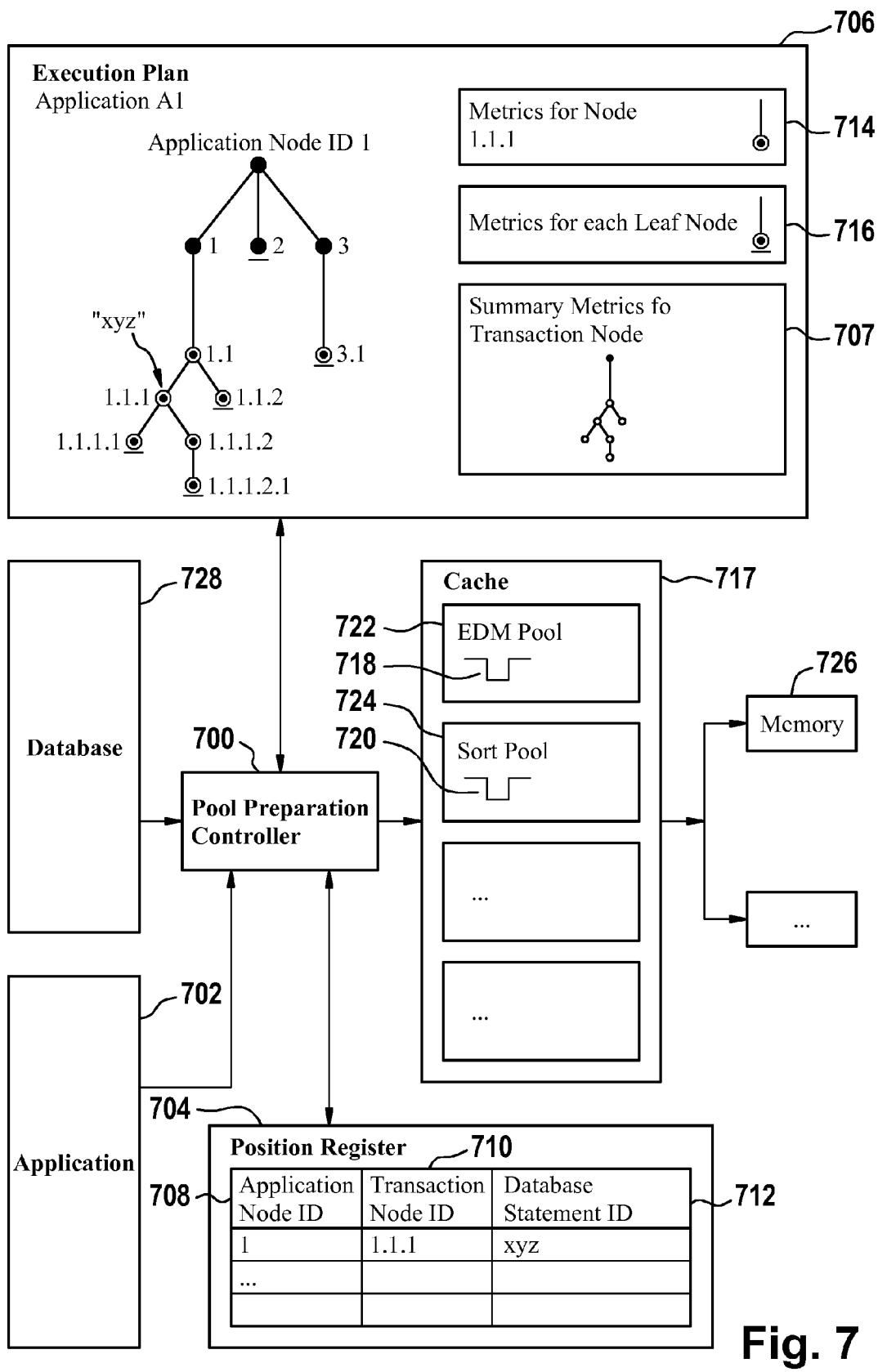
FIG. 7 is a block diagram of a system that illustrates an embodiment of various components of the pre-sent invention.

FIG. 7 is a block diagram of a system that illustrates an embodiment of various components of the present invention. In an exemplarily embodiment, a pool preparation controller (PPC) 700 is used to manage and observe database operations of an application 702 like start or completion of a database statement. For each application 702, the PPC 700 is queried to determine, if the application 702 is already assigned to a respective execution plan 706. For example, the execution plan 706 is already assigned to the application 'A1'. The summary metrics 707 contained in the execution plan 706 is queried in case that a new database transaction is initiated.

For an already existing database transaction, information regarding pool resource requirements for executing the database statement 'xyz' is read from the execution plan 706 in response to an execution request for an individual database statement 'xyz' of a sequence of database statements of the regarding application 'A1'. A position register 704 is queried in order to locate the respective node comprising metrics regarding the database statement 'xyz' describing the respective pool resource requirements. The information stored in the position register 704 comprises for each database statement represented as a node in an execution plan a respective unique application node identifier 'Application Node ID' 708, a respective unique transaction node identifier 'Transaction Node ID' 710 and a respective unique database statement identifier 'Database Statement ID' 712. In case of the database statement 'xyz', the respective node is assigned the unique node ID '1.1.1'. The metrics 714, as well as the metrics 716 of the respective leaf nodes in the path of this node '1.1.1' are read and processed by the PPC 700.

The information processed by the PPC 700 comprises evaluated pool resource requirements for the execution of the respective database statement 'xyz'. These pool resource requirements are sent as a preparation request for pool modification to the respective asynchronous pool preparation queue for example queue 718 of the EDM pool 722 or queue 720 of the sort pool 724 in the cache 717. The respective pool 722 or 724 can use this information during idle periods to prepare asynchronously for upcoming prefetching requests for data storage in the cache regarding the database statement 'xyz', which then can be transferred to for example the memory 726. After execution of the database statement 'xyz', the PPC 700 queries the pool resource requirements used for execution of the database statement 'xyz' from the database 728. These pool resource requirements are then used to update the metrics in the node '1.1.1' of the execution plan 706.

If for example for a different database statement 'abc' querying of the PPC 700 yields, that the database statement 'abc' is not yet assigned a node in the execution plan 706, for example a new respective node '1.1.1.1' will be appended to the execution plan 706. After execution of the database statement 'abc', the used respective pool resource requirements are queried from the database 728 and stored as metrics in the execution plan 706. Then, the position register 704 is updated with the progression of execution of the database statement 'abc', i.e. application node ID 708 '=1', transaction node ID 710 '=1.1.1.1' and database statement ID 712 '=abc'.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CDR/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In the appended claims a computerized method refers to a method whose steps are performed by a computing system containing a suitable combination of one or more processors, memory means and storage means.

While the foregoing has been with reference to particular embodiments of the invention, it will be appreciated by those skilled in the art that changes in these embodiments may be made without departing from the principles and spirit of the invention, the scope of which is defined by the appended claims.

LIST OF REFERENCE NUMERALS 100 data processing system
102 relational database management system
104 volatile memory device
106 microprocessor
108 storage
110 cache memory
112 pool
114 screen
116 input device
118 computer program product
120 database
122 pool
124 asynchronous preparation queue
126 sequence of first database statements
128 sequence of second database statements
130 first individual database statement
132 second individual database statement
134 first execution plan
136 nodes
138 pool resource requirements
140 execution request
142 pool resource requirements
144 preparation request
146 position register
300 execution plan
302 application
304 database transaction
306 sequence of database statements
308 database statement
400 execution plan
402 application node
404 transaction node
406 statement node
416 metrics for each node
418 DBDs
420 RID pool size
422 sort pool size
424 CTs
426 leaf node
428 metrics for each leaf node
430 summary of all DBDs
432 maximum RID pool size
434 maximum sort pool size
436 all CTs
438 summary metrics for transaction node
440 summary of all DBDs
442 maximum RID pool size
444 maximum sort pool size 446 all CTs
700 pool application controller
702 application
704 position register
706 execution plan
707 summary metrics for transaction node
708 application node ID
710 transaction node ID
712 database statement ID
714 metrics for node
716 metrics for leaf node
717 cache
718 asynchronous preparation queue
720 asynchronous preparation queue
722 EDM pool
724 sort pool
726 memory
728 database

The invention claimed is:

1. A computer implemented method of operating a relational database management system (RDBMS), the method comprising:
reading information from a first execution plan, wherein the first execution plan comprises a set of nodes that represent first individual database statements of a sequence of first database statements and wherein each node in the set of nodes comprises information regarding first pool resource requirements for executing the first sequence of database statements, in response to an execution request for second individual database statements of a second sequence of database statements;
processing the information and evaluating second pool resource requirements for execution of the second individual database statements of the second sequence of database statements;
sending a preparation request for pool modification based on the evaluated second pool resource requirements to an asynchronous pool preparation queue;
executing the second individual database statements of the second sequence of database statements, wherein after executing a last of the second individual database statements thereby forming a last executed database statement, the last executed database statement is marked as a leaf node, wherein the leaf node comprises metrics, and wherein the metrics comprise:
a summary of all used database descriptors (DBDs) of all nodes in the respective path of the leaf node of the last executed database statement, the DBDs resulting from execution of the last executed database statement;
a maximum of used storage for caching resource identifiers (RIDs) of all nodes in this path of the leaf node of the last executed database statement, the RIDs resulting from execution of the last executed database statement;
a maximum of used sort pool size of all nodes in this path of the leaf node of the last executed database statement; and
a list of all used cursor tables (CTs) of all nodes in this path of the leaf node of this last database statement, the CTs resulting from querying pool resource requirements for executing the last executed database statement; and
storing information indicative of the progression of execution of the second individual database statements in a position register.

2. The method of claim 1, further comprising: forming the first execution plan, wherein the first execution plan comprises at least one database transaction and wherein the at least one database transaction comprises at least one of the first sequence of database statements or the second sequence of database statements.

3. The method of claim 1, further comprising:
determining if the second sequence of database statements is assigned to the first execution plan; and
in response to the second sequence of database statements not being assigned to the first execution plan, creating a second execution plan.

4. The method of claim 3, wherein information about the second pool resource requirements used for executing the second individual database statements are queried from the RDBMS and updated in the respective one of the first execution plan or the second execution plan.

5. The method of claim 4, wherein the first execution plan comprises metrics for each node in the set of nodes.

6. The method of claim 5, further comprising:
storing information of the second pool resource requirements after executing the second individual database statements, the information of the second pool of resource requirements being stored as metrics in the respective node of the first execution plan, wherein the metrics comprise:
a list of used database descriptors (DBDs) resulting from execution of the second individual database statements cached in an environmental descriptor manager (EDM);
a storage size for cached resource identifiers (RIDs) resulting from execution of the second individual database statements in a RID pool;
in response to sorting operations being used, a maximum sort storage size used for the sorting operations in a sort pool, the sorting operations resulting from execution of the second individual database statements; and
a list of used cursor tables (CTs) in the EDM, the CTs resulting from querying the pool resource requirements for executing the second individual database statements.

7. The method of claim 1, wherein the nodes comprise at least one of application nodes, transaction nodes or statement nodes.

8. The method of claim 7, further comprising:
updating the second pool resource requirements by appending at least one of the statement nodes.

9. The method of claim 1, wherein the information stored in the position register comprises for each active database statement a respective unique application node identifier, a respective unique transaction node identifier and a respective unique database statement identifier.

10. The method of claim 1, wherein summary metrics for all leaf nodes of a given transaction node in the first execution plan and the second execution plan are generated, the summary metrics comprising:
a summary of all database descriptors (DBDs) of all nodes in all possible paths of the respective database transaction of the respective execution plan;
a maximum of used storage for caching resource identifiers (RIDS) of all nodes in all possible paths of the respective database transaction of the respective execution plan;
a maximum of used sort pool size of all nodes in all possible paths of the respective database transaction of the respective execution plan; and
a list of all cursor tables (CTs) of all nodes in all possible paths of the respective database transaction of the respective execution plan.

11. The method of claim 1, wherein summary information for all leaf nodes of the first execution plan is evaluated and sent to the asynchronous pool preparation queue, if a new database transaction is initiated.

12. The method of claim 1, wherein a previous request for pool modification is updated with revaluated pool resource requirements if subsequent individual database statements restrict the remaining tree of database statements in the respective execution plan of the current database transaction.

13. The method of claim 1, wherein the request for pool modification is used by the pool while being idle and wherein the request for pool modification is removed from the asynchronous pool preparation queue if the database transaction is completed.

14. The method of claim 13, wherein an older request for pool modification regarding the second individual database statement is removed from the asynchronous pool preparation queue if an updated request for pool modification regarding the second individual database statement arrives at the queue.

15. A computer program product comprising a non-transitory computer usable medium having a computer readable program, wherein the computer readable program, when executed on a data processing system, causes the data processing system to:

read information from a first execution plan, wherein the first execution plan comprises a set of nodes that represent first individual database statements of a sequence of first data statements and wherein each node in the set of nodes comprises information regarding first pool resource requirements for executing the sequence of database statements, in response to an execution request for second database statements of a second sequence of database statements;

process the information and evaluate second pool resource requirements for execution of the second individual database statements of the second sequence of database statements;

send a preparation request for pool modification based on the evaluated second pool resource requirements to an asynchronous pool preparation queue;

execute the second individual database statements of the second sequence of database statements, wherein after executing a last of the second individual database statements thereby forming a last executed database statement, the last executed database statement is marked as a leaf node, wherein the leaf node comprises metrics, and wherein the metrics comprise:

a summary of all used database descriptors (DBDs) of all nodes in the respective path of the leaf node of the last executed database statement, the DBDs resulting from execution of the last executed database statement;

a maximum of used storage for caching resource identifiers (RIDs) of all nodes in this path of the leaf node of the last executed database statement;

a maximum of used sort pool size of all nodes in this parth of the leaf node of the last executed database statement; and a list of all used cursor tables (CTs) of all nodes in this path of the leaf node of this last database statement, the CTs resulting from querying pool resource requirements for executing the last executed database statement; and store information indicative of the progression of execution of the second individual database statements in a position register.

16. A system for operating a relational database management system (RDBMS), the system comprising:

a processor; and a memory coupled to the processor, wherein the memory comprises instructions which, when executed by the processor, causes the processor to:

read information from a first execution plan, wherein the first execution plan comprises a set of nodes that represent first individual database statements of a sequence of first database statements and wherein each node in the set of nodes comprises information regarding first pool resource requirements for executing the first sequence of database statements, in response to an execution request for a second individual database statements of a second sequence of database statements;

process the information and evaluate second pool resource requirements for execution of the second individual database statements of the second sequence of database statements;

send a preparation request for pool modification based on the evaluated second pool resource requirements to an asynchronous pool preparation queue;

execute the second individual database statements of the second sequence of database statements, wherein after executing a last of the second individual database statements thereby forming a last executed database statement, the last executed database statement is marked as a leaf node, wherein the leaf node comprises metrics, and wherein the metrics comprise:

a summary of all used database descriptors (DBDs) of all nodes in the respective path of the leaf node of the last executed database statement, the DBDs resulting from execution of the last executed database statement;

a maximum of used storage for caching resource identifiers (RIDs) of all nodes in this path of the leaf node of the last executed database statement, the RIDs resulting from execution of the last executed database statement;

a maximum of used sort pool size of all nodes in this path of the leaf node of the last executed database statement; and a list of all used cursor tables (CTs) of all nodes in this path of the leaf node of this last database statement, the CTs resulting from querying pool resource requirements for executing the last executed database statement; and store information indicative of the progression of execution of the second individual database statements in a position register.

* * * * *